(No Model.)
G. A. SACHS.
METHOD OF ORNAMENTING GUN BARRELS.
No. 410,678. Patented Sept. 10, 1889.
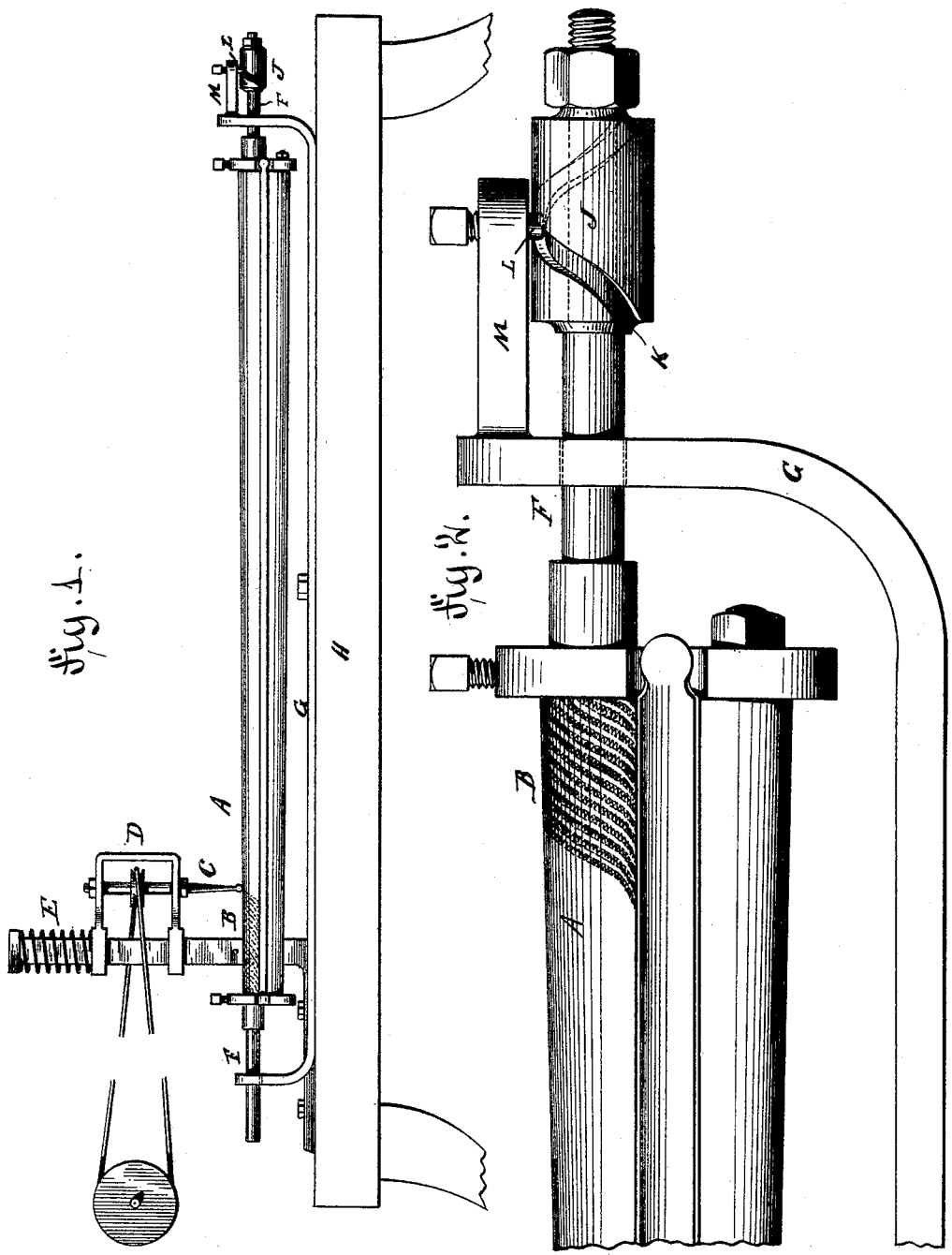
WITNESSES:
Ed. W. Rosenbaum.
Carl Karr
INVENTOR
Gustav Adolf Sachs
BY Göpel & Raegener
ATTORNEYS.

UNITED STATES PATENT OFFICE.

GUSTAV ADOLF SACHS, OF VALLEY CITY, DAKOTA TERRITORY.

METHOD OF ORNAMENTING GUN-BARRELS.

SPECIFICATION forming part of Letters Patent No. 410,678, dated September 10, 1889.

Application filed November 14, 1888. Serial No. 290,840. (No model.)

*To all whom it may concern:*

Be it known that I, GUSTAV ADOLF SACHS, of Valley City, in the county of Barnes and Territory of Dakota, have invented certain new and useful Improvements in Methods of Ornamenting Gun-Barrels, of which the following is a specification.

The object of my invention is to provide a new and improved method of ornamenting gun-barrels, whereby the gun-barrels can be easily and rapidly ornamented to have the characteristic appearance of damaskeened barrels.

The invention consists in producing spiral lines on the outer surface of the gun-barrel by means of a suitable rotary-abrading implement.

In the accompanying drawings, Figure 1 is an elevation of the apparatus which I use in ornamenting gun-barrels. Fig. 2 is a side view of part of a barrel, parts being ornamented.

Similar letters of reference indicate corresponding parts.

The ornamentation consists of a series of spiral lines B on the gun-barrel A, which lines are produced by a suitable rotary implement C, the diameter of which at the working end is equal to the width of the stripes. Stripes of any desired width can be made by using instruments of different diameters.

The implement C has teeth like the teeth of a file, or is in any other suitable manner provided with an abrading-surface on the working end, which abrading-surface cuts into the barrel and produces the stripes.

The implement C is suitably mounted—for example, in a piece D, on which a spring E or a weight acts for the purpose of pressing the working end of the implement against the barrel. Said barrel is mounted in a suitable manner on a rod or spindle F, which is mounted to turn and slide lengthwise in the upturned ends of a U-shaped frame G, held on the bench H, supporting the mechanism for rotating the implement C.

On one end of the spindle F, projecting beyond one of the upturned ends of the frame G, a sleeve J is fixed, which is provided with a spiral groove K, into which a pin L passes from an arm M, projecting from the frame G.

The working end of the implement is placed upon the barrel and then the barrel is turned by hand, whereby the spindle F, on which the barrel is held securely, and the sleeve J also are turned. At the same time the barrel is moved lengthwise by the spiral groove K and the pin L, and the parts of the barrel are thus moved on a spiral line past the working end of the implement C, and thus the implement produces a spiral line on the barrel. The frame G, or the frame carrying the implement C, is then shifted, so that the end of the implement C rests upon the barrel adjacent to the beginning of the spiral line just made, and the barrel is again turned, and so on.

If desired, a number of implements may be grouped to make a series of spiral lines side by side at the same time.

Having thus described my invention, I claim as new and desire to secure by Letters Patent—

The method of ornamenting gun-barrels with spiral lines, consisting in subjecting the gun-barrel to the action of a rotary abrading implement, and at the same time rotating the gun-barrel and moving the same in the direction of its length, so as to cause the said abrading implement to cut spiral lines into the outer surface of the barrel, substantially as set forth.

In testimony that I claim the foregoing as my invention I have signed my name in presence of two subscribing witnesses.

GUSTAV ADOLF SACHS.

Witnesses:
C. E. HEIDEL,
F. W. HEIDEL.